United States Patent [19]

Adolfsson

[11] Patent Number: 4,673,375
[45] Date of Patent: Jun. 16, 1987

[54] FRICTION COATING FOR CONTACTING ELEMENTS OF A CONSTANT VELOCITY JOINT

[75] Inventor: Rune Adolfsson, Borås, Sweden

[73] Assignee: SKF Nova AB, Gothenburg, Sweden

[21] Appl. No.: 824,568

[22] Filed: Jan. 23, 1986

[30] Foreign Application Priority Data

Feb. 22, 1985 [SE] Sweden ............................... 8500869

[51] Int. Cl.⁴ ............................................. F16D 3/23
[52] U.S. Cl. .................................... 464/145; 464/906
[58] Field of Search ............. 384/491, 492, 513, 516, 384/565, 569; 428/403, 469; 464/145, 146, 906

[56] References Cited

U.S. PATENT DOCUMENTS

| | | | |
|---|---|---|---|
| 2,427,237 | 9/1947 | Suczek | 464/906 X |
| 2,845,311 | 7/1958 | Cobb | 384/569 |
| 3,802,753 | 4/1974 | Parker | 384/491 |
| 4,150,905 | 4/1979 | Kaplan et al. | 428/403 X |
| 4,293,171 | 10/1981 | Kakumoto et al. | 384/492 |
| 4,508,396 | 4/1985 | Doi et al. | 384/492 X |

FOREIGN PATENT DOCUMENTS 133825 8/1984 Japan ................................ 464/145

Primary Examiner—Daniel P. Stodola
Attorney, Agent, or Firm—Eugene E. Renz, Jr.

[57] ABSTRACT

In a constant velocity joint having an inner and an outer part with opposite grooves in which are arranged rolling bodies guided by a retainer, the grooves and/or the rolling bodies are provided with a friction coefficient increasing surface layer in order to give reduced contact stresses between rolling bodies and retainer.

4 Claims, 3 Drawing Figures

FRICTION COATING FOR CONTACTING ELEMENTS OF A CONSTANT VELOCITY JOINT

FIELD OF THE INVENTION

The present invention relates to improvements in constant velocity joints and particularly to a novel friction coating for at least one of the contacting elements of the assembly having a coefficient of friction considerably greater than the starting point coefficient of friction thereby to reduce the contact stresses between the contacting elements such as the rolling elements and the retainer.

BACKGROUND OF THE INVENTION

Joints of this type are usually used for power transmission to driven or steered wheels of motor vehicles. The rotational axes of the rotatable members interconnected by means of the joint shall have an ability of being angularly tilted up to about 50° in order to allow a satisfactory guiding.

At big angular tilt and big torque transmission the rolling bodies of the joint will be subjected to big, unsymmetrical forces in certain positions, when the rolling bodies contact walls in grooves crossing each other, whereby the rolling bodies will be pressed against the retainer in such a manner that friction losses and wear will appear at the contact between the rolling bodies and the retainer, where sliding will occur.

SUMMARY OF THE INVENTION

The purpose of the present invention is to provide a joint of the type defined in the preamble, in which friction and wear is kept at a minimum, which causes the service life to be increased and transmission losses to be reduced in relation to what is common at conventional joints of the type concerned.

The functional advantages described above are achieved in accordance with the present invention by providing at least one of the contacting elements of the friction joint with surface layers having a friction coefficient considerably higher than the friction coefficient in a corresponding contact between two steel surfaces.

Such a joint may have the same shape and assembly dimension as earlier known constant velocity joints and, therefore, requires no special arrangements for being used in all ordinary connections. The features mentioned can be obtained in simple and inexpensive manner.

BRIEF DESCRIPTION OF THE DRAWINGS

These and other objects of the present invention and the various features and details thereof are hereinafter more fully set forth with reference to the accompanying drawing wherein.

DESCRIPTION OF THE PREFERRED EMBODIMENT

Figure 3:
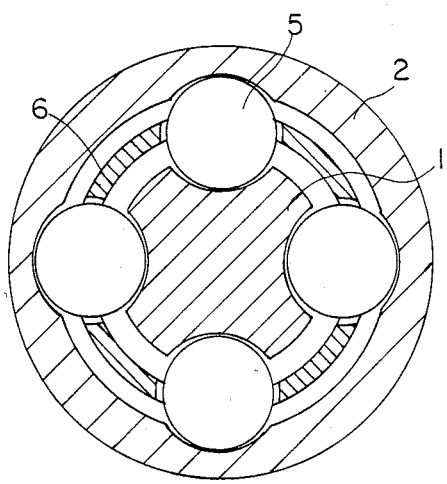
FIG. 3 shows a cross-section of a diagrammatical embodiment of a constant velocity joint in which the invention can be applied.

A constant velocity joint incorporates an inner part 1 and an outer part 2, each part being attached to a rotatable member, e.g. a drive shaft and a vehicle wheel in a motor vehicle with driven and steerable wheels. The rotational axes of the interconnected members, and thereby also of the inner and outer joint parts 1, 2 together can form a variable angle, which is designed $\alpha$ in FIG. 1. FIG. 3 shows the position when $\alpha=0$. The inner part 1 is enclosed in a portion of the outer part 2. The parts 1, 2 are provided with a number of grooves 3, 4, which are situated opposite each other pair by pair. A rolling body 5 is arranged in each pair of grooves. The rolling bodies are guided in an annular retainer 6 and transmit torque between the joint parts 1, 2.

Figure 1:
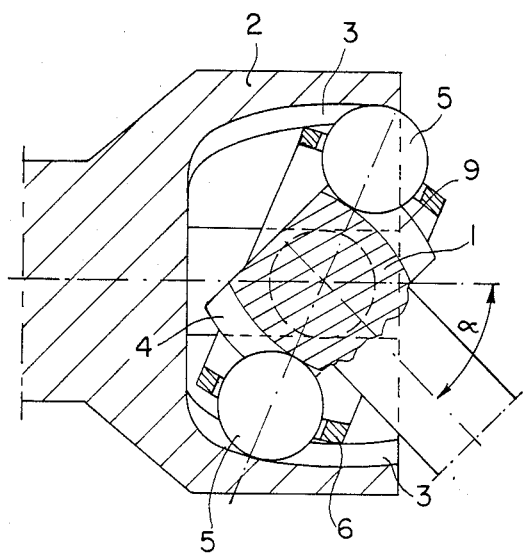
FIG. 1 shows a longitudinal section.
Figure 2:
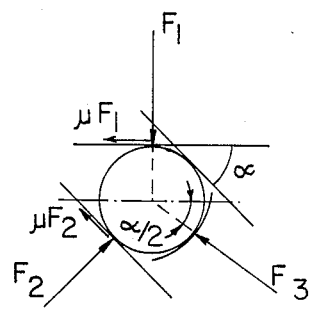
FIG. 2 shows how the forces from the retainer and grooves in the different joint members act upon an unsymmetrically loaded rolling body.

When the joint parts 1, 2 are angularly tilted relative to each other by an angle $\alpha$, such as shown in FIG. 1, the rolling body situated in a plane perpendicular to the plane of section in FIG. 1, will become squeezed between two angularly tilted grooves. The positions of the grooves and of the rolling body are intimated with dash lines in FIG. 1 and the forces acting upon the rolling body are shown in FIG. 2. The squeezing forces from the rolling body contact with the different grooves are $F_1$ and $F_2$ respectively. As these forces are unsymmetric it is necessary that the rolling body is subjected to further forces in order to obtain balance. A force thereby occurring is $F_3$, which is the contact force between the rolling body and the rolling body retainer 6. This force occurs in a sliding contact and, therefore, causes wear and friction losses. If no friction occurs in the contacts between rolling bodies and grooves, the force is $$F_3 = (F_1 + F_2) \sin \alpha/2$$

If on the other hand the contacts between the rolling bodies and the grooves have a friction coefficient $\mu$ there are also the forces $\mu F_1$ and $\mu F_2$ which act upon the rolling body, whereby $$F_2 = (F_1 + F_2) \sin \alpha/2 - (F_1 + F_2)\mu \cos \alpha/2.$$

From this it can be seen that the force $F_3$ will be reduced if the friction coefficient $\mu$ increases. When $\mu$ reaches the value tan $\alpha/2$ the force $F_3$ is completely eliminated. If the angle $\alpha$ is at most 50°, a friction coefficient $\mu$ of about 0.5 then will bring about that the contact force between the rolling body and the retainer will be neglectable at all conditions. If the friction coefficient is about 0.3 the contact force is thus almost eliminated during most conditions. The contact force thus can be reduced or eliminated by increasing the friction coefficient in the contacts between the rolling body and the grooves. The invention is based on this finding, and according to the invention the grooves and/or the rolling bodies are provided with surface layers which make the friction coefficient considerably higher than the friction coefficient in a corresponding contact between two steel surfaces. It thereby can be appropriate to provide the surfaces with surface layers of a ferric-boron compound. Beside giving a high friction coefficient such a step also will give a considerably improved wear resistance compared to a contact between steel surfaces. The layers can be applied e.g. by means of a chemical vacuum-deposition method. Another possible step is to give at least one of the contact surfaces a chrome carbide layer. Such a layer give a high coefficient of friction and a low wear in contact with a ball bearing steel. If thereby only the grooves are provided with a friction coefficient increasing layer, it is avoided that the friction increases at possible contact between the rolling body and the retainer.

Other embodiments of the invention than the one described above are, of course, possible. The shapes of the grooves, the rolling bodies and other components forming part of the joint can be varied, as well as the type of the layers applied.

What is claimed is:

1. In a constant velocity joint for torque transmitting interconnection of two relatively rotatable members comprising inner and outer parts connected to the members, a plurality of torque transmitting rolling elements having first contact surfaces mounted between and engaging second contact surfaces of the inner and outer parts in a contact zone and a retainer for guiding the rolling elements, the improvement comprising a frictional coating on at least one of all of said first contact surfaces of said rolling elements and all of said second contact surfaces of both said inner and outer parts whereby the coefficient of friction in the contact zone is considerably greater than the friction coefficient in a corresponding contact zone between first and second contact surfaces made of steel to reduce the contact stresses between the rolling elements and the retainer.

2. A joint as claimed in claim 1, characterized therein, that the frictional coating is a ferric-boron compound.

3. A joint as claimed in claim 1, characterized therein, that the frictional coating is a chrome carbide layer.

4. In a constant velocity joint as claimed in claim 1, including a frictional coating on both said first and second contact surfaces.

* * * * *